May 11, 1937. A. T. HARVEY 2,079,611
BABY'S NURSING BOTTLE HEATER
Filed Sept. 23, 1936 2 Sheets-Sheet 1
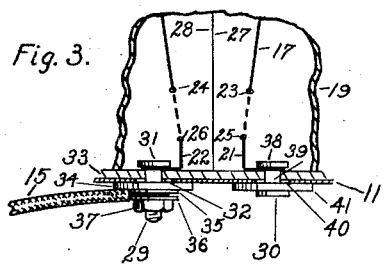
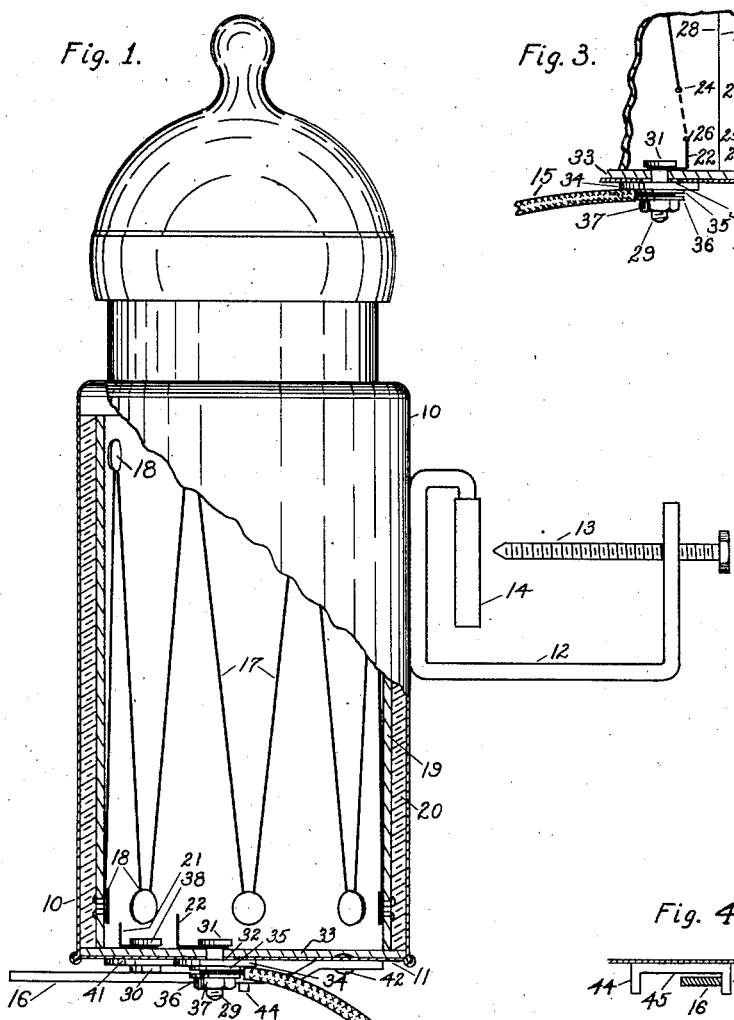
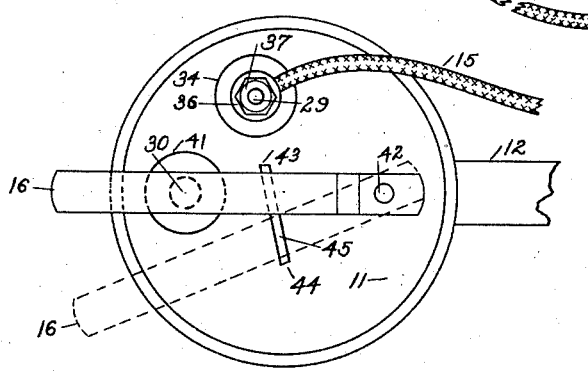
INVENTOR
Alexander T. Harvey INVENTOR
Alexander T. Harvey Patented May 11, 1937

2,079,611

UNITED STATES PATENT OFFICE 2,079,611

BABY'S NURSING BOTTLE HEATER

Alexander T. Harvey, Muskogee, Okla.

Application September 23, 1936, Serial No. 102,079½

2 Claims. (Cl. 219—19)

The invention relates to a means by which a baby's nursing bottle and its contents may be heated within an automobile, the energy being supplied by the automotive electric system.

The invention is particularly applicable among motorists making trips with small babies, whose regular hours of feeding make it necessary to heat said bottle and its contents while traveling, or at such times when proper facilities for heating same are not otherwise available.

Another object of the invention is to provide a means by which automobile campers with small babies may heat the baby's nursing bottle and its contents without exposing same to the smoke and ashes of an open fire.

In the accompanying drawings:

Fig. 1 shows a cut-away side view of the heater with the usual baby's nursing bottle.

Fig. 2 is a view of the bottom of the heater showing the switch and the binding post in detail.

Fig. 3 is a cut-away sectional view looking outward through the binding post and the switch lever contact showing the connections of the same to the heating element.

Fig. 4 is a view of the switch lever stops looking away from the point of pivot of the switch lever showing a cross-section of the shell bottom and a cross-section of the switch lever.

Figure 5:
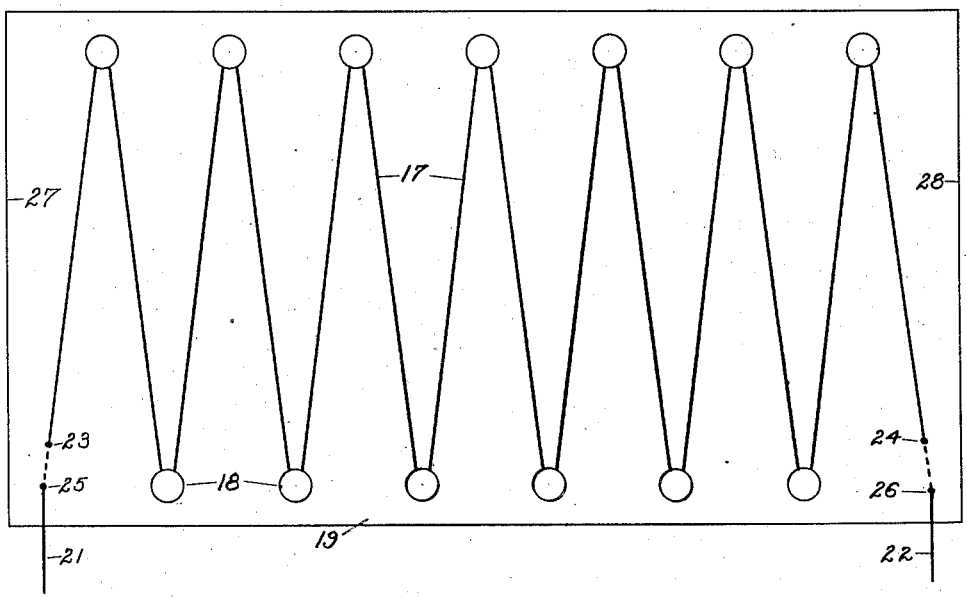
Fig. 5 is a view of the heating unit before it is rolled into cylindrical form.

In the figures, and best shown in Fig. 1 the cylindrical heater shell 10, provided with a bottom 11, is attached to the dashboard of an automobile by the clamp 12, which is provided with a clamping screw 13, and a pad 14 to prevent scratching of the dashboard. The heater is attached to the electric system of said automobile by the flexible conductor 15, and is turned "on" and "off" by the switch lever 16. The heating element 17 by the aid of the rivets 18 is attached to the inner periphery of a stiff composition supporting cylinder 19 of good thermal and electrical insulating qualities, which is separated from the heater shell 10 by a layer of sheet asbestos 20, thereby minimizing heat transmission to the atmosphere, and also serving as an electrical insulation between the ends of the heating element rivets 18 and the metallic heater shell 10.

In Fig. 5 the heating unit before it is rolled into cylindrical form is shown in detail. The heating element 17 is wound in zig-zag fashion around and under the heads of the rivets 18, which are attached to the stiff composition supporting sheet 19. The said element 17 terminates in the leads 21 and 22, which are secured to the stiff composition supporting sheet 19 by passing to the back side of said sheet through the holes 23 and 24, and thence to the front side of said sheet through the holes 25 and 26 respectively. When the unit is rolled into a cylinder, the edges 27 and 28 meet as shown in Fig. 3.

Referring to Fig. 3, the heating element lead 22 is fastened under the head 31 of the threaded binding post 29, which passes through the center of an aperture 32 in the shell bottom 11. The aperture 32 being of larger diameter than the diameter of the binding post 29, permits the two of being insulated from each other. The head 31 of the binding post 29 is insulated from the shell bottom 11 by the bottom lining disc 33 of insulating material, and serving also to hold the binding post 29 in the center of the aperture 32. The binding post 29 is further insulated from the shell bottom 11 by a fibre insulating washer 34. The flexible conductor 15 is fastened to the binding post 29 between two metallic washers 35 and 36, and the entire binding post assembly is held in place by the nut 37. The heating element lead 21 is fastened under the head 38 of the switch lever contact screw 39 which passes through the center of an aperture 40 in the shell bottom 11. The contact screw 39 is further insulated from the shell bottom 11 by the bottom lining disc 33 and the fibre washer 41 in a similar fashion as was the binding post 29 insulated from the shell bottom 11. The switch lever contact 30 containing an internal thread is screwed onto the end of the contact screw 39 thereby holding the assembly in place. The protruding end of the contact screw 39 is ground off flush with the surface of the switch lever contact 30.

In Fig. 2 the switch is shown in detail. The switch lever 16 of good electrical conducting material is attached and pivoted to the metallic shell bottom 11 by the rivet 42. The said lever is in an "on" position when directly over and resting on the contact 30. The said lever is in an "off" position when as shown in dotted form. The arc of the switch lever 16 is limited by the stop 43 when in an "on" position, and by the stop 44 when in an "off" position. The body 45 of the switch lever stops 43 and 44, shown in Fig. 4 is attached to the shell bottom 11.

The flexible conductor 15 best shown in Fig. 1 terminates in the metallic eyelet 46 which is placed on one of the terminals of the ammeter of the automotive electric system.

Figure 6:
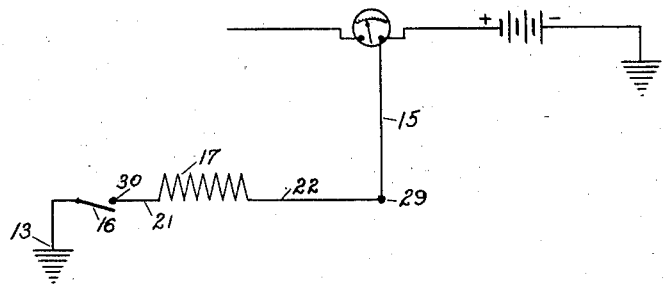
Fig. 6 is a diagrammatic representation of the essential parts of the heater and its connection to the automotive electric system.

A diagram of connections is shown in Fig. 6. Assuming the grounded pole of the battery in the automotive electric system to be negative, and the positive pole of said battery to be connected to the ammeter of said electric system, the current flow when the switch is in an "on" position is as follows: From the ammeter of said electric system the current flows through the flexible conductor 15, the binding post 29, the lead 22 into the heating element 17. The current leaves the heating element 17 through the lead 21 and passes successively through the contact screw 39, the contact 30 into the switch lever 16, thence to the shell bottom 11, the shell 10, and the clamp 12 and the clamping screw 13 to the metallic dashboard of the automobile which is grounded, thereby completing the circuit.

I wish it to be understood that I do not desire to be limited to the exact details of construction shown and described herein, for obvious modifications may occur to a person skilled in this field.

I claim:

1. A combination for the heating of a baby's nursing bottle and its contents with energy supplied from an automotive electric system, comprising a casing fitted with a clamp attachable to the dashboard of said automobile, a resistance heating unit contained therein and insulated both thermally and electrically from the casing, one terminal of said heating unit connected to the ungrounded side of said electric system, and a single pole switch operative to connect the remaining terminal of said heating unit to the grounded side of said electric system thereby completing the electric circuit.

2. A combination for the heating of a baby's nursing bottle and its contents with energy supplied from an automotive electric system, comprising a casing fitted with a clamp attachable to the dashboard of said automobile, a resistance heating unit contained therein, and a switch operative to connect said heating unit to said electric system; said heating unit being composed of a wire heating element wound in zig-zag fashion around and under the heads of rivets secured to the inner periphery of a stiff composition supporting cylinder of good electric and thermal insulating qualities.

ALEXANDER T. HARVEY.